United States Patent [19]
Dyson

[11] 3,846,484
[45] Nov. 5, 1974

[54] PROCESS FOR THE PREPARATION OF 1,2,3,4,9,12-HEXAHYDRO-PHENANTHRENES

[75] Inventor: Norman H. Dyson, Palo Alto, Calif.

[73] Assignee: Syntex Corporation, Panama, Panama

[22] Filed: Dec. 14, 1970

[21] Appl. No.: 98,046

[52] U.S. Cl. ........ 260/514.5, 260/410.5, 260/468 B, 260/468.5, 260/476 C, 260/482 R, 260/484 R, 260/487, 260/488 CD, 260/600, 260/613 R, 260/617.5
[51] Int. Cl. ...................... C07c 51/36, C07c 69/76
[58] Field of Search ........... 260/468.5, 514.5, 617.5

[56] References Cited
UNITED STATES PATENTS
3,657,329  4/1972  Edwards et al. ................. 260/514.5
3,681,427  8/1972  Edwards et al. ................. 260/468.5

OTHER PUBLICATIONS
Kravch et al., Organic Name Reactions, p. 53, (1964).
House II, Modern Synthetic Reactions, pp. 64–65, (1965).
House, Modern Synthetic Reactions, pp. 67–68, (1964).

*Primary Examiner*—Robert Gerstl
*Attorney, Agent, or Firm*—Walter H. Dreger; Gerard A. Blaufarb; William B. Walker

[57] ABSTRACT

A process for preparing certain 1,2,3,4,9,12-hexahydrophenanthrenes which involves the single, basic step of reducing a 1,2,3,4-tetrahydrophenanthrene with an alkali metal in a lower alkyl amine or di(lower) amine or in liquid ammonia. The 1,2,3,4,9,12-hexahydrophenanthrene products are, and can be converted to other, useful estrogenic and anti-fertility agents.

10 Claims, No Drawings

PROCESS FOR THE PREPARATION OF 1,2,3,4,9,12-HEXAHYDRO-PHENANTHRENES

The present invention relates to advances in organic process chemistry. More particularly, the present invention is directed to a new one step method useful for preparing 1,2,3,4,9,12-hexahydrophenanthrenes which are useful estrogenic and anti-fertility agents.

The class of useful 1,2,3,4,9,12-hexahydrophenanthrene compounds which can be prepared in accordance with the novelty of the present invention and, if necessary and desired, other modification reactions known per se, can be depicted as follows by Formula (A):

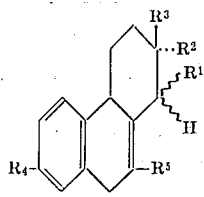

wherein $R^1$ is ethyl or methyl;

$R^2$ is carboxy and the alkali metal salts thereof, carb(lower)alkyloxy, formyl, or hydroxymethyl and the conventional hydrolyxable esters and ethers thereof;

$R^3$ is methyl or ethyl;

$R^4$ is lower alkyloxy, hydroxy or the conventional hydrolyzable esters or ethers thereof; and $R^5$ is hydrogen or methyl.

These compounds have been first disclosed together with a utility statement and a method of preparation in copending application, Ser. No. 883,582, filed Dec. 9, 1969 now U.S. Pat. No. 3,681,427. Thus, these 1,2,3,4-,9,12-hexahydrophenanthrenes possess estrogenic and anti-fertility and are accordingly useful in replacement therapy for estrogen deficiencies and in the control and regulation of fertility and in the management of various menstrual disorders and are employed in accordance with these uses in the same manner as known estrogenic and anti-fertility agents.

The method of preparing these compounds disclosed in Ser. No. 883,582, filed Dec. 9, 1969, as above cited, involves a basic two step method of reducing a 1,2,3,4-tetrahydrophenanthrene compound to the corresponding 1,2,3,4,5,8,9,12-octahydrophenanthrene and aromatizing the latter to prepare the 1,2,3,4,9,12-hexahydrophenanthrene products. The first step is conducted with an alkali metal and a lower monohydric alcohol in a lower alkyl amine or di(lower alkyl)amine or in liquid ammonia and the second step is conducted with pyridinium hydrobromide perbromide.

Now it has been discovered that 1,2,3,4,9,12-hexahydrophenanthrene compounds can be prepared in a single basic step from 1,2,3,4-tetrahydrophenanthrene starting compounds. By means of fundamental modifications of the first step of the cited two-step method, the need of the second step is unexpectedly and surprisingly rendered unnecessary.

The process of the present invention consists essentially of the step of reducing a 1,2,3,4-tetrahydrophenanthrene with an alkali metal in a lower alkyl amine, di(lower alkyl)amine, or liquid ammonia to prepare the corresponding 1,2,3,4,9,12-hexahydrophenanthrene. In accordance with this invention, therefore, 1,2,3,4,9,12-hexahydrophenanthrene compounds are prepared from 1,2,3,4-tetrahydrophenanthrene compounds in a single basic step. This process can be depicted by the following equation of partial formulas:

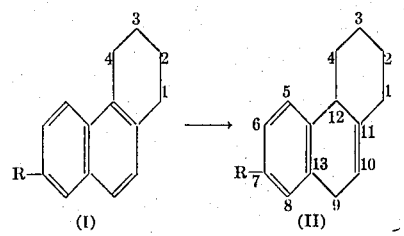

wherein R is hydroxy or a conventional hydrolyzable ester thereof.

The present invention is practiced with starting materials containing a 7-hydroxy or 7-ester group, preferably hydroxy, as depicted in the above equation as the R group. In the preparation of the compounds of Formula (A) above wherein $R^4$ is lower alkloxy or a conventional hydrolyzable ether, the present invention is preferably practiced upon a 7-hydroxy compound and the product thereafter conventionally etherified via methods known per se. Further, the process of the present invention is preferably practiced with starting compounds in which $R^2$ is carboxy and the alkali metal salts thereof, carb(lower)alkyloxy, hydroxymethyl or the conventional hydrolyzable esters thereof. The other substituents defined by $R^2$ are, in the preferred embodiments, introduced at a time subsequent to the principal single step reaction hereof. The particular identity of the substituents defined by $R^1$, $R^3$, and $R^5$ in the starting compounds is generally of no consequence to the practice of the present invention.

In the practice of the process of the present invention, a 1,2,3,4-tetrahydrophenanthrene compound (I) is reduced with an alkali metal, such as sodium, potassium and lithium in a lower alkyl amine or di(lower)alkyl amine, for example, methyl amine, diethyl amine, and the like or in liquid ammonia to obtain the 1,2,3,4,-9,12-hexahydrophenanthrene compound (II). The reaction is conducted with a preformed solution of alkali metal in amine or ammonia and in the absence of lower monohydric alcohol. The reaction is conveniently conducted in non alcoholic organic liquid reaction media. Suitable media include the common organic solvents such as tetrahydrofuran, dioxane, n-hexane, diethyl ether, glyme, diglyme, and the like.

The reaction is conducted at temperatures ranging from about −80°C. to about 60°C. and, preferably, at the boiling point of the reaction mixture and under reflux and for a period of time sufficient to complete the reaction ranging from about 1 hour to about 14 days.

In carrying out this reaction, the reactants are contacted and maintained together in any convenient order or fashion. They are then maintained within or about the cited temperature range for a period of time sufficient to produce the product. Following the reaction, the product is recovered and isolated from the reaction mixture following conventional techniques such as decantation, filtration, distillation, extraction, evaporation, and chromatography. Further elaboration, if desired, is then carried out.

The given reaction consumes the respective reactants in the ratio of 1 mole of starting compound per 4 moles of alkali metal. However, the amounts of the reactants to be employed are not critical, some of the desired product being obtained when employing any proportions thereof. In the preferred embodiments hereof, the appropriate reactants are employed in amounts ranging from about 4 moles to about 100 moles of the alkali metal per mole of starting compound, the ammonia or amine being employed in large excess.

The $R^4=$ hydroxy products of the present one-step method can be etherified by conventional means, if desired. Thus, the hydroxy compounds can be treated with a diazoalkane, such as diazomethane or diazoethane or with alkyl sulfate or alkyl iodide to give the lower alkyloxy ethers. Alternatively, they can be treated with 2-chlorotetrahydropyran or 2-chlorotetrahydrofuran to give the tetrahydropyran-2-yl and tetrahydrofuran-2-yl ethers or with cyclopentyl bromide and sodium hydride to give the cyclopentyl ether.

Alternatively, the conventional esterification at C-7 forms the corresponding 7-acetate. This compound is then converted to the acid chloride and this compound converted to the trichloroethyl acid ester. Selective carbonate hydrolysis of the acetate followed by etherification at C-7 as described above and removal of the trichloroethylacid ester with zinc in 90 percent aqueous acetic acid affords the C-7 ether product in the acid series.

The product acids are also useful for the preparation of the corresponding acid esters via the intermediate acid chloride and appropriate alcohol. The preparation of the hydroxymethyl ($R^2$) compounds is conducted from the 2-carb(lower)alkyloxy ester starting material. The hydroxymethyl products can be conventionally esterified or etherified. The hydroxymethyl products can also be oxidized to the aldehydes with chromic acid in pyridine. The aldehydes can be further oxidized to the acids. Alternatively, the acid ester ($R^2$) starting compounds can be first reduced by reaction with lithium aluminum hydride in tetrahydrofuran to form the corresponding hydroxymethyl compounds. These can be conventionally etherified or they can be used as starting compounds herein.

The compounds of the present invention of the formula:

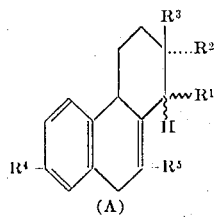

(A)

wherein $R^1$ is methyl or ethyl;

$R^2$ is carboxy and the alkali metal salts thereof, carb-(lower)alkyloxy, formyl, or hydroxymethyl and the conventional hydolyzable esters and ethers thereof;

$R^3$ is methyl or ethyl;

$R^4$ is lower alkyloxy, hydroxy or the conventional hydrolyzable esters and ethers thereof; and $R^5$ is hydrogen or methyl;

are prepared by the process comprising reducing a compound of the partial formula (I') with an alkali metal in a lower alkyl amine or di(lower alkyl) amine or in liquid ammonia and in the absence of lower monohydric alcohol:

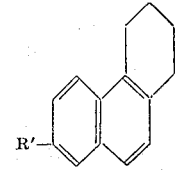

(I')

to prepare the corresponding compound of partial formula (II'):

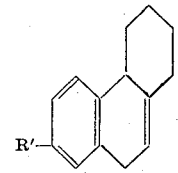

(II')

wherein R' is hydroxy or a conventional hydrolyzable ester thereof;

followed by, in optional order and to the extent desired or required:

1. cleaving any ester or ether group to the corresponding alcohol or hydroxy;
2. converting any carboxylic acid to the corresponding ester,
3. converting any carboxylic acid to the corresponding salt,
4. reducing any ester to the corresponding alcohol,
5. hydrolyzing any acid ester to the corresponding acid,
6. oxidizing any alcohol to the corresponding aldehyde,
7. oxidizing any aldehyde to the corresponding acid,
8. esterifying any hydroxyl group, and etherifying any hydroxyl group.

The 1,2,3,4-tetrahydrophenanthrene starting compounds hereof are known or can be prepared in accordance with known processes. See, for example, *Helv. Chim. Acta.* 28, 1506 (1945) and *Helv. Chim. Acta.* 777 (1947) and U.S. Pat. application by Edwards Ser. No. 589,494, filed Oct. 26, 1966 for "Ethers Containing a Phenanthrene Nucleus," and the references cited in each, and *Medicinal Chemistry*, Volume II, John Wiley and Sons, Inc., N.Y., 1956. Thus, for further example, preparation of the ethers of the hydroxymethyl compounds follows upon etherification with dihydropyran (for the tetrahydropyran-2-yl ethers) and dihydrofuran (for the tetrahydrofuran-2-yl ethers) and 4-methoxy-5,6-dihydro-2H-pyran (for the 4-methoxytetrahydropyran-4-yloxy ethers) with acid catalyst in inert solvent. Cyclopentyl ethers are prepared upon reaction of the hydroxy compound with sodium hydride and cyclopentyl bromide. The corresponding esters are prepared by reacting the hydroxymethyl compound with a hydrocarbon carboxylic acid anhydride in the presence of pyridine.

The C-10 methyl starting compounds are prepared in accordance with the procedure described in U.S. Pat. Application Ser. No. 638,648, filed May 15, 1967 by Edwards and Fried for *Phenanthrene-2-Carboxylic*

*Acids,* which is hereby incorporated by reference. This method involves reacting a 2-(3-methyl-1, 2,3,4-tetrahydronaphthyliden)-ethyl isothiouronium acetate together with a tetronic acid in an aqueous organic solution at about room temperature to prepare the corresponding α-[2-(3-methyl-1,2,3,4-tetrahydronaphthaliden)-ethyl]-tetronic acid compound. This compound is then contacted with a strong acid optionally in an organic solvent at a temperature of from about room temperature to about reflux to prepare the corresponding 7-methyl-16-oxaestra-1,3,5(10),8,14-pentane-17-one steriod. Dehydrogenation thereof with palladium catalyst forms the corresponding 6,7-dehydro derivative thereof or treatment of the steroid with an alkali metal hydroxide aqueous organic solution at about room temperature prepares the corresponding 1-acetyl-10-methyl-1,2,3,4-tetrahydrophenanthrene-2-carboxylic acid alkali metal salt. This can be subjected to carbonyl reduction and thence converted to the acid ester with an alkyl iodide which can be converted to the free acid upon base hydrolysis.

Representative starting tetrahydrophenanthrene compounds are the following:

1β,2β-dimethyl-2α-carboxy-7-hydroxy-1,2,3,4-tetrahydrophenanthrene,

1α-ethyl-2α-carbomethoxy-2β-methyl-7-hydroxy-10-methyl-1,2,3,4-tetrahydrophenanthrene, 1α-methyl-2α-hydroxymethyl-2β-ethyl-7-hydroxy-1,2,3,4-tetrahydrophenanthrene, 1β,2β-diethyl-2α-tetrahydropyran-2'-yloxymethyl-7-hydroxy-1,2,3,4-tetrahydrophenanthrene, 1β,2β,10-trimethyl-2α-carboxy-7-hydroxy-1,2,3,4-tetrahydrophenanthrene, 1α-ethyl-2α-carboethoxy-2β-methyl-7-acetoxy-1,2,3,4-tetrahydrophenanthrene, 1α,10-dimethyl-2α-hydroxymethyl-2β-ethyl-7-hydroxy-1,2,3,4-tetrahydrophenanthrene, 1α,2β-diethyl-2α-cyclopentyloxymethyl-7-hydroxy-1,2,3,4-tetrahydrophenanthrene, 1β-methyl-2α-carboxy-2β-ethyl-7-propionyloxy-1,2,3,4-tetrahydrophenanthrene, and 1β-ethyl-2α-tetrahydropyran-2'-yloxymethyl-2β,10-dimethyl-7-acetoxy-1,2,3,4-tetrahydrophenanthrene.

In the present specification and claims, the term "lower alkyloxy" denotes the group —OAlkyl, alkyl being a straight or branched chain saturated hydrocarbon group containing from 1 to 6 carbon atoms, inclusive, such as methyl, ethyl, n-propyl, isopropyl, n-butyl, isobutyl, t-butyl, pentyl, amyl, hexyl, and the like. The expression "conventional hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2] octane-1-carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl ether, cyclopentyl ether, and the like. The expression "carboxy" denotes the —$CO_2H$ group and "formyl" the —CHO group.

In the present specification and claims, the wavy lines ( ) at the C-1 position of the phenanthrene nucleus indicates the configuration alpha or beta or mixtures thereof. Thus, the compounds of the present invention can exist in two *d* and two *l* forms, that is, *d*-cis, *d*-trans, *l*-cis, and *l*-trans. In addition, two racemates are possible, that is, *dl*-cis and *dl*-trans. While each or mixtures are included within the scope hereof, the *dl*-cis racemate is preferred.

With respect to the other center of asymmetry present at the C-12 position, the process of the present invention by which the compounds are prepared generates both the individual alpha and beta isomers or mixtures thereof. The individual 12α and 12β isomers are separable by chromatography and each and the mixture thereof are included within the scope of the present invention.

For the purposes of the present invention, the conventional numbering of the various carbon positions on the phenanthrene nucleus is employed. For example, as used herein, the position of the $R^5$ substituent is designated and defined as the C-10 ring position.

The following preparation and examples further illustrate the manner by which the present invention can be practiced, and represent, in one aspect, the best mode for carrying out the invention. As such, however, they should be construed merely as illustrative and not as limitative upon the overall scope hereof.

PREPARATION 1

A solution of 1 g. of 3-methoxybenzoic acid in 50 ml. of benzene is treated with 2 g. of thionyl chloride. The mixture is heated at reflux under anhydrous conditions for 2 hours and then evaporated under reduced pressure. The residue is dissolved in 20 ml. of benzene and this solution is evaporated to dryness to yield 3-methoxybenzoyl chloride.

A solution of 1 g. of the latter compound in 50 ml. of anhydrous ether is heated to reflux and a solution of 5 g. of diethyl cadmium and 50 ml. of anhydrous ether is added. After being heated to reflux for 20 hours the mixture is extracted with ether. These extracts are washed with water to neutrality and evaporated to yield 3-methoxy propiophenone.

A mixture of 1 g. of the latter compound and 0.5 g. of glyoxylic acid in a solution of 0.5 g. of potassium hydroxide in 10 ml. of water and 10 ml. of ethanol is allowed to stand at room temperature for a period of 18 hours. The solid which forms is collected by filtration, washed with water and dried to yield 3-(3'-methoxybenzoyl)-2-butenoic acid.

A suspension of 0.5 g. of 5 percent palladium-on-charcoal catalyst in 50 ml. of methanol is hydrogenated for 30 minutes. A solution of 1 g. of the latter compound and 200 ml. of methanol is added and hydrogenated with agitation until the uptake of hydrogen has ceased. The catalyst is removed by filtration and the solution is evaporated to yield 3-(3'-methoxybenzoyl) butanoic acid.

A mixture of 1 g. of the latter compound, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200°C., and finally for an additional 2 hours at reflux. The mixture is cooled, water added and the product isolated by extraction with ether. These extracts are dried over sodium sulfate and evaporated to yield 3-(3'-methoxybenzyl) butanoic acid.

A mixture of 1 g. of the latter material in 10 ml. of polyphosphoric acid is heated on a steam bath for a period of about 8 hours. The reaction mixture is then poured into ice water and the mixture is extracted several times with ether. The ether extracts are combined and evaporated to dryness to give 3-methyl-6-methoxy-1-tetralone.

A mixture of 1 g. of 3-methyl-6-methoxy-1-tetralone in 20 ml. of acetic acid is saturated with hydrogen bromide gas. The mixture is then allowed to stand for 24 hours and then the reaction mixture is concentrated. The thus-obtained residue, 25 ml. of 95 percent methanol and 0.5 g. of potassium hydroxide is refluxed for 1 hour. The reaction mixture is then poured into ice water and the solid which forms is collected by filtration, washed with water and dried to yield 3-methyl-6-hydroxy-1-tetralone.

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of h3-methyl-6-methoxy-1-tetralone in 25 ml. of tetrahydrofuran and 10 ml. of ether and resulting mixture is held at room temperature for a period of 24 hours, then heated at reflux for 1 hour and then cooled. The reaction mixture is then poured into water, acidified with hydrochloric acid and stirred vigorously to decompose any excess Grignard reagent. The organic phase is then separated and the aqueous layer is extracted several times with ether. The combined ether extracts are washed with water to neutrality, dried over sodium sulfate and evaporated to dryness to yield the crude 3-methyl-6-methoxy-1-vinyl-1-tetralol.

A mixture of 11.8 g. of thiourea and 100 ml. of acetic acid is warmed on a steam bath until the mixture becomes homogeneous. The solution is then cooled to room temperature and to it is then added 32 g. of 3-methyl-6-methoxy-1-vinyl-1-tetralol. The resulting mixture is agitated until the mixture again becomes homogeneous. The acetic acid is then removed by heating (50°–60°C.) under reduced pressure to afford a syrup. The syrup is poured with stirring into 70 ml. of ether. The resulting precipitate is collected and dried to yield 2-(3-methyl-6-methoxy-1,2,3,4-tetrahydronaphthyliden)ethyl isothiouronium acetate which can be recrystallized from methanol:ether.

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional 2 hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposited a precipitate of α,γ-dimethyl tetraonic acid which is collected by filtration and recrystallized from benzene:-hexane.

To a solution of 12.5 g. of 2-(3-methyl-6-methoxy-1,2,3,4-tetrahydronaphthyliden)ethyl isothiouronium acetate in a mixture of 80 ml. ethanol, and 100 ml. of water, is added a solution of 5.1 g. of α,γ-dimethyl tetronic acid in 20 ml. ethanol. Immediately, the reaction mixture is diluted by adding an additional 80 ml. of water, stirred and allowed to stand at room temperature for a period of 16 hours. The reaction mixture is then cooled to 5°C. for 2 hours, and the thus-formed precipitate collected by filtration to yield α-[2-(3-methyl- 6-methoxy-1,2,3,4-tetrahydronaphthyliden)-ethyl]-α,Δ-dimethyl tetronic acid.

Nine grams of α-[2-(3-methyl-6-methoxy-1,2,3,4-tetrahydronaphthyliden)-ethyl]-α,γ-dimethyl tetronic acid and 460 mg. of p-toluenesulfonic acid in 120 ml. of benzene is heated at reflux for 4 hours, during which time water is continuously removed from the reaction mixture by a Dean Dean-Strak trap. After cooling, the reaction mixture is filtered through a short column of silica gel and evaporated under reduced pressure to yield 3-methoxy-7,15-dimethyl-16-oxaestra-1,3,5(10), 8, 14-pentaen-17-one which is recrystallized from ether.

A mixture of 0.5 g. of 3-methoxy-7,15-dimethyl-16-oxaestra-1,3,5(10),8,14-pentaen-17-one and 5 mg. of 5 percent palladium-on-charcoal catalyst and 75 ml. of xylene is heated at reflux for 36 hours. The mixture is then cooled, filtered to remove the catalyst and the filtrate is evaporated under reduced pressure to yield a residue containing predominantly 3-methoxy-7,15-dimethyl-6-oxaestra-1,3,5(10),6,8,14-hexaen-17-one and a small amount of 3-methoxy-7,15-dimethyl-16-oxa-14β-estra-1,3,5(10),6,8-pentaen-17-one. The residue is purified by preparative thin layer chromatography and crystallized from methanol to yield 3-methoxy-7,15-dimethyl-16-oxa-estra-1,3,5 (10),6,8,14-hexaen-17-one. 3-methoxy-7,15-dimethyl-16-oxaestra-1,3,5(10),8,14-pentaen-17-one, 0.4 g. of maleic acid and 0.25 g. of 5 percent palladium-on-charcoal catalyst and 75 ml. of benzene is heated at reflux for about 24 hours. The mixture is then cooled to room temperature and filtered. The filtrate is then washed with dilute aqueous sodium bicarbonate solution, dried and evaporated to yield 3-methoxy-7,15-dimethyl-16-oxaestra-1,3,5(10),6,8,14-hexaen-17-one which is crystallized from methanol.

A mixture of 250 mg. of 3-methoxy-7,15-dimethyl-16-oxaestra-1,3,5(10),6,8,14-hexaen-17-one in 25 ml. of absolute ethanol and 10 ml. of 1N aqueous sodium hydroxide solution is allowed to stand at room temperature for 24 hours. The reaction mixture is then filtered and the thus-collected crystalline residue is washed with water and dried to yield the sodium salt of cis 7-methoxy-1-acetyl-2,10-dimethyl-1,2,3,4 -tetrahydrophenanthrene-2-carboxylic acid.

A mixture of 307 mg. of sodium salt of cis 7-methoxy-1-acetyl-2,10-dimethyl-1,2,3,4-tetrahydrophenanthrene-2-carboxylic acid, 1 ml. of methyl iodide and 7 ml. of dimethylacetamide is stirred in the dark for 5 hours. Then, excess methyl iodide is removed by evaporation under reduced pressure. The reaction mixture is then poured into water and the mixture extracted several times with ether. The ether extracts are combined, washed with water, and then dilute aqueous sodium thiosulfate solution, dried and evaporated to furnish the methyl ester of cis 7-methoxy-1-acetyl-2,10-dimethyl-1,2,3,4-tetrahydrophenanthrene-2-carboxylic acid which can be crystallized from benzene-hexane.

Into the cathode compartment of a divided electrolysis cell provided with a cellulose dialysis membrane, lead electrodes (each electrode measuring 2 × 5 × 1.6 mm.) and a stirrer, there is added 20 mg. of methyl ester of cis 7-methoxy-1-acetyl-2,10-dimethyl-1,2,3,4-tetrahydrophenanthrene-2-carboxylic acid and a mixture of 15 ml. of dioxane and 15 ml. of 10 percent aqueous sulfuric acid (by weight). An additional amount of a mixture of 15 ml. of dioxane and 15 ml. of 10 percent aqueous sulfuric acid is added to the cell. A current density of 0.02 amps./cm.$^2$ is applied for a period of 5 hours. The reaction mixture is then removed from the cell and concentrated under reduced pressure to a small volume which is then extracted several times with ether. The ether extracts are combined, washed with water and a 5 percent aqueous sodium bicarbonate solution, dried and evaporated to dryness to furnish the methyl ester of cis 7-methoxy-1-ethyl-2,10-dimethyl-1,2,3,4-tetrahydrophenanthrene-2-carboxylic acid.

A mixture of 330 mg. of the methyl ester of cis 7-methoxy-1-ethyl-2,10-dimethyl-1,2,3,4-tetrahydrophenanthrene-2-carboxylic acid, 3.5 g. of potassium hydroxide, 7 ml. of ethanol and 7 ml. of water in a sealed tube is heated at about 180°C. for 45 minutes. The reaction mixture is allowed to cool and is then poured into water. The resulting mixture is then acidified by the addition of dilute aqueous hydrochloric acid and extracted several times with the ethyl acetate. The ethyl acetate extracts are combined, dried and evaporated to furnish cis 7-methoxy-1-ethyl-2,10-dimethyl-1,2,3,4-tetrahydrophenanthrene-2-carboxylic acid.

EXAMPLE 1

Lithium metal (65 mg.) is dissolved in 10 ml. of ammonia at −33°C. over a period of 0.5 hours. The resultant solution is cooled to −78°C. and to the thus cooled solution is added 57 mg. of 1α-ethyl-2α-carboxy-2β-methyl-7-hydroxy-1,2,3,4-tetrahydrophenanthrene in 4 ml. of dry tetrahydrofuran, over a period of about 5 minutes and with stirring. The resultant mixture is then stirred at −78°C. for 11 hours. After the first three hours, 65 mg. of lithium is added. The reaction mixture is worked up by the addition of water followed by 20 ml. of 2N HCl and 20 ml. of ethyl acetate. After washing, the residue is chromatographed on silica eluting with acetone: hexane (30:70) and acetone to give 1α-ethyl-2α-carboxy-2β-methyl-7-hydroxy-1,2,3,4,9,12-hexahydrophenanthrene.

Similarly 1α-ethyl-2α-hydroxymethyl-2β-methyl-7-hydroxy-1,2,3,4,9,12-hexahydrophenanthrene is prepared.

EXAMPLE 2

Liquid ammonia which has been dried over sodium metal and distilled (600 ml.), 300 ml. of dry tetrahydrofuran, and 54 g. of lithium wire are mixed together with stirring at −78°C. Ten g. of 1α-ethyl-2α-carboxy-2β-methyl-7-acetoxy-1,2,3,4-tetrahydrophenanthrene are then added to the mixture while continuing the stirring. To the resultant mixture are added 54 g. of additional lithium in 2.0 g. portions over a period of 24 hours while maintaining the reaction mixture at −33°C. After this period, the ammonia is allowed to evaporate and 2 l. of a saturated, aqueous solution of sodium dihydroorthophosphate is added to the concentrate. The resultant mixture is then extracted with ethyl acetate and the extract is dried over sodium sulfate and evaporated. The concentrate, after evaporation, is then fractionally crystallized from ethyl acetate to provide the 1α-ethyl-2α-carboxy-2β-methyl-7-hydroxy-1,2,3,4,9,12-hexahydrophenanthrene product.

EXAMPLE 3

To a mixture of 300 mg. of dioxane, 25 ml. of ammonia and 25 mg. of lithium wire is added 1α-ethyl-2α-carbomethoxy-2β-ethyl-7-hydroxy-1,2,3,4-tetrahydrophenanthrene (104 mg.) in 15 ml. of tetrahydrofuran with stirring at −78°C. The resultant mixture is kept at −78°C. for 2 days. It is then worked up as described in Example 1 to obtain the 1α-ethyl-2α-hydroxymethyl-2β-phenanthrene product.

The procedure of Example 3 is repeated employing, in lieu of lithium each of sodium and potassium and repeated employing, in lieu of ammonia, each of methyl amine and diethyl amine, with similar results in each instance.

EXAMPLE 4

A mixture of 1 g. of 1α-ethyl-2α-hydroxymethyl-2β-methyl-7-hydroxy-1,2,3,4,9,12-hexahydrophenanthrene, 10 ml. of pyridine and 5 ml. of acetic anhydride is allowed to stand at room temperature for 15 hours. The mixture is then poured into ice water and the solid which forms is collected by filtration, washed with water and dried. The residue is chromatographed to yield 1α-ethyl-2α-acetoxymethyl-2β-methyl-7-acetoxy-1,2,3,4,9,12-hexahydrophenanthrene, 1α-ethyl-2α-acetoxymethyl-2β-methyl-7-hydroxy-1,2,3,4,9,12-hexahydrophenanthrene, 1α-ethyl-2α-hydroxymethyl-2β-methyl-7-acetoxy-1,2,3,4,9,12-hexahydrophenanthrene, and 1α-ethyl-2α-hydroxymethyl-2β-methyl-7-hydroxy-1,2,3,4,9,12-hexahydrophenanthrene.

In like manner, the propionyloxy, -butroyloxy methyl, -caproyloxy, and -trimethylacetoxy esters of the above compounds are prepared by using the corresponding acylating agent. In like manner, the other 7-hydroxy and/or 2α-hydroxymethyl compounds of the present invention are esterified as described above.

Two milliliters of dihydropyran are added to a solution of 1g. of 1α-ethyl-2α-hydroxymethyl-2β-methyl-7-hydroxy-1,2,-3,4,9,12-hexahydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1α-ethyl-2α-tetrahydropyran-2'-yloxymethyl-2β-methyl-7-tetrahydropyran-2'-yloxy-1,2,3,4,9,12-hexahydrophenanthrene which is recrystallized from pentane.

By employing the method of the preceding paragraph using dihydrofuran in lieu of dihydropyran, there is prepared the corresponding 1α-ethyl-2α-tetrahydrofuran-2'-yloxymethyl-2β-methyl-7-tetrahydrofuran-2'-yloxy-1,2,3,4,9,12-hexahydrophenanthrene product. Similarly, the 1α-ethyl-2α-(4'-methoxy-tetrahydropyran-4'-yloxy-methyl)-2β-methyl-7-(4'-methoxytetrahydropyran-4'-yloxy)-1,2,3,4,9,12-hexahydrophenanthrene product is prepared by utilization of the foregoing procedure employing 4-methoxy-5,6-dihydro-2H-pyran in lieu of dihydropyran.

A solution of one chemical equivalent of 1α-ethyl-2α-hydroxymethyl-2β-methyl-7-hydroxy-1,2,3,4,9,12-hexahydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1α-ethyl-2α-cyclopentyloxymethyl-2β-methyl-7-cyclopentyloxy-1,2,3,4,9,12-hexahydrophenanthrene which is further purified upon recrystallization from pentane.

Similarly, the foregoing methods produce the corresponding 2α-(etherified methyl)-7-hydroxy compounds and 2α-(hydroxymethyl)-7-ether compounds.

EXAMPLE 5

To a solution of 3 g. of 1α-ethyl-2α-carboxy-2β-methyl-7-hydroxy-1,2,3,4,9,12-hexahydrophenanthrene in 50 ml. of methylene chloride are added an excess of diazomethane in ether (obtained from nitrosomethylurea) and a few drops of methanol. The reaction mixture is maintained at room temperature for 18 hours and the excess reagent is then decomposed by the addition of acetic acid. The resulting mixture is poured into water and the organic layer is separated, washed with water to neutrality and evaporated to dryness to yield 1α-ethyl-2α-carbomethoxy-2β-methyl-7-methoxy-1,2,3,4,9,12-hexahydrophenanthrene product.

In a manner similar to the above, the other corresponding 2α-carboalkyloxy compounds and 7-alkyloxy compounds of the present invention are prepared.

The following is illustrative of C-7 hydrolysis. One gram of 1α-ethyl-2α-carbomethoxy-2β-methyl-7-methoxy-1,2,3,4,9,12-hexahydrophenanthrene is dispersed in 4 ml. of dry 2,4,6-collidine at room temperature. Lithium iodide (1.5 g.) which has been dried at 300°C. under a nitrogen atmosphere is added and the mixture is then heated to the boiling point and maintained under reflux for 10 hours. After this period of time, the reaction is acidified with HCl and the acidified mixture extracted with ethyl acetate. The extracts are dried over magnesium sulfate and evaporated to provide a concentrate which is fractionally crystallized from methanol/$H_2O$ to obtain the 1α-ethyl-2α-carboxy-2β-methyl-7-hydroxy-1,2,3,4,9,12-hexahydrophenanthrene product.

1α-ethyl-2α-carbomethoxy-2β-methyl-7-methoxy-1,2,3,4,9,12-hexahydrophenanthrene is hydrolyzed with zinc metal in 90 percent aqueous acetic acid at room temperature to provide 1α-ethyl-2α-carboxy-2β-methyl-7-methoxy-1,2,3,4,9,12-hexahydrophenanthrene.

EXAMPLE 6

To a solution of 14.2 mg. of 1α-ethyl-2α-hydroxymethyl-2β-methyl-7-methoxy-1,2,3,4,9,12-hexahydrophenanthrene in 150 ml. of dry dimethylsulfoxide is added a solution of 49.6 mg. of dicyclohexylcarbodiimide in 300μμ of dimethylsulfoxide, followed by the addition of a solution of 2μμ of trifluoroacetic acid, 3.8μ of pyridine and 50μ of dimethylsulfoxide. After reaction, the mixture is partitioned between water and diethyl ether. The ether extracts are washed with water, dried and evaporated. The residue is subjected to thin-layer chromatography to obtain the 1α-ethyl-2α-formyl-2β-methyl-7-methoxy-1,2,3,4,9,12-hexahydrophenanthrene product.

EXAMPLE 7

To a stirred solution of 1 g. of 1β-ethyl-2α-formyl-2β-methyl-7-cyclopentyloxy-1,2,3,4,9,12-hexahydrophenanthrene in 10 ml. of acetone, cooled to 0°C., is added under nitrogen a solution of 8N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0°–5°C. and diluted with water. The solid which forms is collected by filtration, washed with water and dried under vacuum to yield 1β-ethyl-2α-carboxy-2β-methyl-7-cyclopentyloxy-1,2,3,4,9,12-hexahydrophenanthrene which may be further purified by recrystallization from acetone: hexane.

EXAMPLE 8

To a solution of 10 g. of 1α-ethyl-2α-carboxy-2β,10-dimethyl-7-methoxy-1,2,3,4,9,12-hexahydrophenanthrene in 200 ml. of ethanol is added the theoretical amount of potassium hydroxide dissolved in 200 ml. of 90 percent ethanol. The reaction mixture is then concentrated in vacuum giving potassium 1α-ethyl-2β,10-dimethyl-7-methoxy-1,2,3,4,9,12-hexahydrophenanthrene-2α-carboxylate.

What is claimed is:

1. The process which consists essentially of reducing a compound of the following formula:

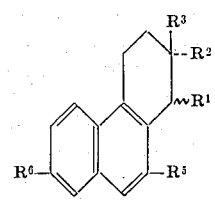

wherein
$R^1$ is methyl or ethyl;
$R^2$ is carboxy, carb(lower)alkyloxy or hydroxymethyl;
$R^3$ is methyl or ethyl;
$R^5$ is hydrogen or methyl; and
$R^6$ is hydroxy or the acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo octane-1-carboxylate, or adamantoate ester thereof, with an alkali metal in a lower alkyl amine, di(lower alkyl) amine, or liquid ammonia and in the absence of lower monohydric alcohol and acidic proton donor, to prepare the corresponding 1,2,3,4,9,12-hexahydrophenanthrene.

2. The process according to claim 1 conducted at from about −80°C. to about +60°C.

3. The process according to claim 1 conducted with lithium in liquid ammonia.

4. The process according to claim 3 conducted in non alcoholic organic liquid reaction media.

5. The process according to claim 1 wherein $R^6$ is hydroxy.

6. The process according to claim 5 conducted at from about −80°C. to about +60°C.

7. The process according to claim 6 conducted with lithium in liquid ammonia.

8. The process according to claim 1 wherein 1α-ethyl-2α-carboxy-2β-methyl-7-hydroxy-1,2,3,4-tetrahydrophenanthrene is reacted with lithium in liquid ammonia at from about −80°C. to about −33°C. to prepare 1α-ethyl-2α-carboxy-2β-methyl-7-hydroxy-1,2,3,4,9,12-hexahydrophenanthrene.

9. The process according to claim 8 conducted in non alcoholic organic liquid reaction media.

10. The process according to claim 8 conducted in tetrahydrofuran.

* * * * *

UNITED STATES PATENT OFFICE
CERTIFICATE OF CORRECTION

Patent No. 3,846,484                   Dated   November 5, 1974

Inventor(s)  Norman H. Dyson

It is certified that error appears in the above-identified patent and that said Letters Patent are hereby corrected as shown below:

Column 2, line 21 "alkloxy" should read --alkyloxy--.

Column 3, Formula A, that portion of the formula reading

" 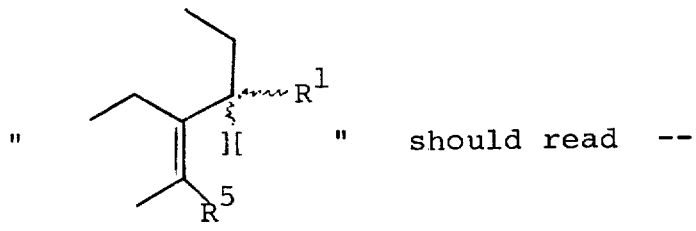 " should read -- 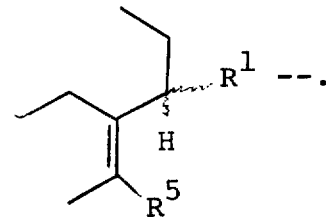 --.

Column 4, line 42, --9.-- should appear before "etherifying any hydroxyl group".

Column 5, line 12 "pentane-" should read --pentaen- --.

Column 6, line 4, "( )" should read --(~~)--.

Column 8, line 9 "-α,Δ-" should read -- -α,γ- --.

Column 8, line 16 "Dean Dean-Strak trap" should read --Dean-Stark trap--.

Column 9, line 3, "2 x 5 x 1.6 mm." should read --2 cm. x 5 cm. x 1.6 mm. --.

Signed and sealed this 24th day of June 1975.

(SEAL)
Attest:

RUTH C. MASON
Attesting Officer

C. MARSHALL DANN
Commissioner of Patents
and Trademarks